Oct. 3, 1961    E. MITTELMANN    3,002,383

ELECTROMAGNETIC INDUCTION FLOWMETER

Filed Dec. 28, 1956

Inventor
Eugene Mittelmann
by Prangley, Clayton & Vogel
Attorneys

United States Patent Office 3,002,383
Patented Oct. 3, 1961

3,002,383
ELECTROMAGNETIC INDUCTION FLOWMETER
Eugene Mittelmann, 427 W. Wrightwood, Chicago, Ill.
Filed Dec. 28, 1956, Ser. No. 631,146
6 Claims. (Cl. 73—194)

This invention relates to electromagnetic type flowmeters for measuring the flow of fluids and more particularly rates of fluid flow that are pulsating in character.

The rates of fluid flows have been measured heretofore by electronic type flowmeters. Such flowmeters include a conduit or pipe usually circular in cross section to confine the flowing fluid. A magnetic field is established across the fluid stream and arranged such that the fluid threads at right angles the force lines of the exciting magnetic field. Disposed on opposite sides of the conduit are electrodes used to detect the voltage induced in the fluid by flow thereof through the exciting magnetic field. The voltage induced in the electrodes is proportional to the velocity of the fluid and to the intensity of the exciting magnetic field.

The present invention has particular use in measuring rates of fluid flow in which the rate is pulsating, the pulsating rate being either short or long. The invention has been illustrated applied to flowmeters wherein the exciting magnetic field is induced by an A.C. voltage. In such instruments the signal induced in the electrodes is an A.C. voltage proportional to the velocity of the liquid and the intensity of the exciting magnetic field and is also in phase with the magnetic field.

Instruments of this type used heretofore in order to be accurate have required individual calibration and have depended upon external sources of reference such as standard sources of potential for calibration. Other instruments of this type used heretofore have incorporated therein a plurality of expensive linear amplifier circuits and other expensive circuit elements when an instrument is to be used to measure rates of flow with a high degree of accuracy. Various current and voltage regulators have also been used in such prior instruments since serious errors would be introduced therein when variations occurred in the voltage for the exciting magnetic field and when variations occurred in the magnetic properties of the associated magnetic members. To compensate for these latter errors relatively complicated compensating circuits have been used.

Accordingly, it is an important object of the present invention to provide an electromagnetic flowmeter of the type set forth and more particularly an electromagnetic flowmeter which can accurately measure pulsating rates of fluid flow.

Another object of the invention is to provide a flowmeter of the type set forth in which a minimum of linear circuit elements are required and in which calibration in a large part depends only on the physical constants of the instrument and not upon external standards of reference and particularly standard sources of voltage.

Yet another object of the invention is to provide a more accurate and more reliable flowmeter of the type set forth for use in measuring pulsating flow rates.

Still another object of the invention is to provide an electromagnetic flowmeter of the type set forth which is independent of variations in the voltage source for the exciting magnetic field and of variations in the exciting current.

Yet another object of the nvention is to provide an electromagnetic flowmeter which is substantially independent of variations in the ambient temperature and of variations in the magnetic properties in the exciting magnet and other component parts.

Another object of the invention is to provide an improved electromagnetic flowmeter of the type set forth which is more simple in construction and operation and less expensive in construction and operation.

A still further object of the invention is to provide an electromagnetic flowmeter of the type set forth which provides an accurate totalization of flow over relatively long periods of time.

These and other objects and advantages of the present invention will be better understood from the following description when taken in conjunction with the accompanying drawings. In the drawings wherein like reference numerals have been utilized to indicate like parts throughout:

Figure 1:
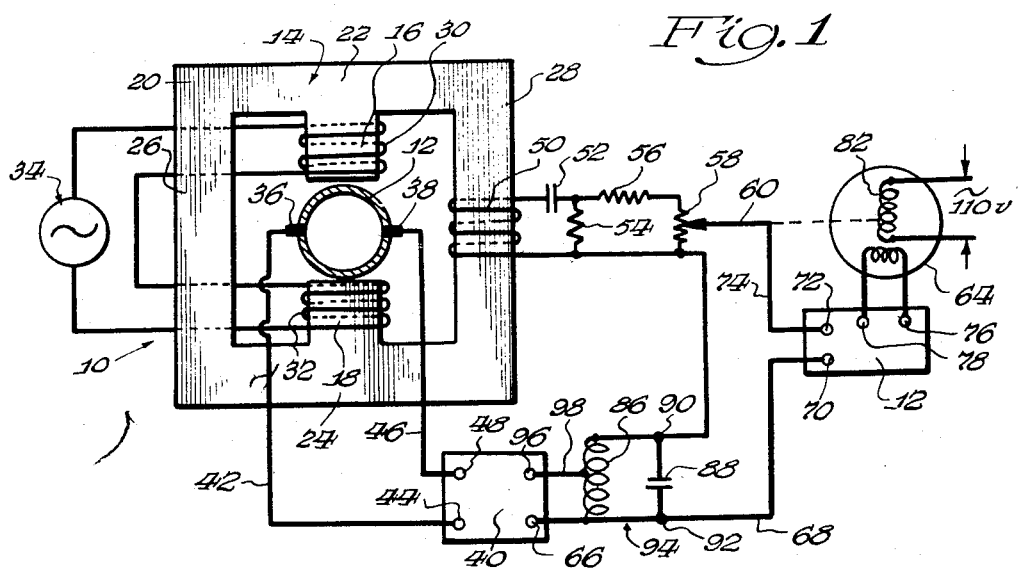
FIGURE 1 is a schematic diagram of an electromagnetic flowmeter made in accordance with and embodying the principles of the present invention.

Referring to the drawings and particularly to FIGURE 1 thereof, there is shown a flowmeter generally designated by the numeral 10 which is made in accordance with and embodies the principles of the present invention. The flowmeter 10 includes a conduit or pipe 12 which is illustrated as being circular in cross section. Pipe 12 is preferably formed of non-magnetic material such as a suitable plastic to confine the fluid stream being measured during the measurement thereof. An electromagnet generally designated by the numeral 14 is disposed about pipe 12 and includes a pair of poles 16 and 18 disposed on opposite sides of pipe 12. A continuous yoke 20 interconnects poles 16 and 18 and, more specifically, includes a leg 22 formed integral with pole 16 and a leg 24 formed integral with pole 18. Legs 22 and 24 are in turn connected by a pair of legs 26 and 28, leg 22, 24, 26 and 28 forming a continuous magnetic path for magnetic flux lines.

Wound upon pole 16 is an exciting coil 30 and a similar coil 32 is provided upon pole 18. Coils 30 and 32 are connected in series with each other and also to a source of alternating voltage generally designated by the numeral 34. Voltage source 34 energizes coils 30 and 32 and may be of the ordinary 60 cycle type or may preferably be a thousand cycle source. Coils 30 and 32 when energized by voltage source 24, excite magnet 14 and establish a flux field across pipe 12. Liquid in pipe 12 flows in a direction perpendicular to the force lines of the magnetic field so established whereby to induce a voltage in the flowing liquid. A pair of electrodes 36 and 38 is provided in the walls of pipe 12 at opposite ends of a diameter thereof, the line interconnecting electrodes 36 and 38 being perpendicular to the force lines of the field established across pipe 12. Electrodes 36 and 38 therefore have the voltage induced in the flowing liquid appearing therebetween.

Measurement of the rate of flow of liquid through pipe 12 is accomplished by measuring the voltage appearing between electrodes 36 and 38. This signal voltage is proportional to the flux field established by means of coils 30 and 32 across pipe 12 and the rate of flow of liquid through pipe 12. In certain installations the flow signal appearing between electrodes 36 and 38 is sufficiently large to be used directly for measurement purposes but in many installations the flow signal will be small thereby necessitating amplification in order to obtain a useful working signal. To this end a linear amplifier 40 is provided to amplify the flow signal appearing between electrodes 36 and 38. Preferably amplifier 40 is a decade amplifier having a high degree of negative feed-back. A first line 42 connects electrode 36 to an input terminal 44 on amplifier 40 and a second line 46 similarly connects electrode 38 to input terminal 48.

In the present invention the flow signal from electrodes 36 and 38 either directly or as amplified by amplifier 40, as the case may be, is compared with a voltage also induced by the flux field established in yoke 20. To this end leg 28 of magnet 14 is provided with a coil 50 which has induced therein a voltage proportional to the flux field established in yoke 20 but 90 degrees out of phase therewith and 90 degrees out of phase with the voltage induced between electrodes 36 and 38. In order to make a direct comparison between the flow signal across electrodes 36—38 and the voltage induced in coil 50, the voltage induced in coil 50 first has the phase thereof shifted 90 degrees by any suitable phase shifting network. Such a phase shifting network may be an integrating circuit such as the one illustrated in the drawings and including a capacitor 52 and a resistor 54. Capacitor 52 has one plate thereof connected to one terminal of coil 50 and the other plate thereof connected to one end of resistor 54. The other end of resistor 54 is connected to the other terminal of coil 50.

In general the voltage induced in coil 50 is too large conveniently to be used directly to compare with the flow signal even when the flow signal is amplified. Therefore, a voltage divider network is provided. More specifically, one terminal of a resistor 56 is connected to the junction between capacitor 52 and resistor 54 and the other terminal of resistor 56 is connected to one end of a potentiometer resistor 58. The other terminal of resistor 58 is connected to the junction between resistor 54 and coil 50. Potentiometer resistor 58 is provided with a slider 60 movable along the length of resistor 58 to make electrical contact therewith at any desired point.

The comparison between the flow signal appearing across electrodes 36 and 38 and the reference voltage appearing on slider 60 is made by a self-balancing electronic potentiometer including a differential amplifier diagrammatically illustrated in the drawings and designated by the numeral 62. Amplifier 62 is arranged and connected so as to amplify only the difference between the amplified flow signal and the reference voltage, the difference voltage being used to drive a two-phase motor 64 which is mechanically connected to and moves slider 60 to a point on potentiometer resistor 58 having a potential equal to that of the flow signal as amplified by amplifier 40. Since amplifier 62 is used only to amplify a difference signal, this amplifier may be non-linear in character and therefore inexpensive and simple in construction and operation.

Connection is made from one of the output terminals 66 of the linear amplifier 40 through line 68 to an input terminal 70 of the difference amplifier 62. The other input terminal 72 of amplifier 62 is connected through a line 74 to slider 60 whereby to apply to amplifier 62 the reference voltage on slider 60. Output terminals 76 and 78 of amplifier 62 are connected to the fixed coil 80 of the two-phase motor 64. Movable coil 82 of motor 64 is connected to a source of alternating current such as a standard 60 cycle 110-volt line. Mechanical connection is made between the movable coil 82 and the slider 60 as has been explained above.

Amplifier 62 being of the differential type will amplify a signal corresponding to the difference between the voltage appearing across the portion of potentiometer 58 lying between slider 60 and the connection between potentiometer 58 and resistor 54 and the flow signal appearing between electrodes 36 and 38 as amplified by amplifier 40. This difference signal is amplified and used to energize coil 80. Energization of coil 80 causes movement of the movable coil 82 in a direction such as to move slider 60 to reduce the difference signal to zero. As long as a difference exists between the amplified flow signal appearing across electrodes 36—38 and the potential at which slider is positioned along potentiometer 58, motor 64 will move slider 60 in a direction which reduces the difference to zero. When the difference has been reduced to zero, the motor 64 and the slider 60 will stop. The slider 60 in this position will be contacting potentiometer 58 at a point such that the potential appearing there is equal to the amplified flow signal supplied by amplifier 40.

The flow signal voltage will then be expressed in terms of the position of slider 60 along the potentiometer resistor 62. The manner in which the value of the flow signal can be computed will now be demonstrated. As explained previously, the flow signal appearing between electrodes 36 and 38, which will hereafter be designated $e_t$, is given by the equation:

$$e_t = K_1 \phi u d \quad (1)$$

This equation states that the flow signal is proportional to the intensity of the magnetic field, $\phi$, to the velocity, $u$, of the liquid and to the diameter, $d$, of the flow tube 12. $K_1$ is a proportionality factor dependent upon the geometry of the system.

The induced voltage in coil 50, referred to hereinafter as $e_i$, is proportional to the first derivative of the field intensity and the value thereof can be mathematically expressed by the following equation wherein $K_2$ is a proportionality factor:

$$e_i = K_2 \frac{d\phi}{dt} \quad (2)$$

When the exciting field derived from voltage source 34 is sinusoidal, Equations 1 and 2 can be rewritten as Equations 3 and 4, respectively, as follows:

$$e_t = K_1 \phi \sin \omega t \, d \quad (3)$$

$$e_i = K_2 \phi \cos \omega t \quad (4)$$

From the above equations it is seen that there is a 90 degree phase difference between the flow signal $e_t$ appearing across electrodes 36 and 38 and the voltage $e_i$ induced in coil 50. This is illustrated diagrammatically in FIGURE 2 of the drawing where it is further seen that the flow signal $e_t$ is also in phase with the induced field $\phi$. In order to use the voltage $e_i$ induced in coil 50 as a reference voltage, it is necessary to shift the phase thereof until it is in phase with flow signal $e_t$. This can be done by integration as can be illustrated mathematically by the following equation:

$$\int e_i dt = K_2 \phi \sin \omega t \quad (5)$$

Such an integration is accomplished by means of the integrating circuit including capacitor 52 and resistor 54. The voltage appearing across resistor 54, hereinafter referred to as $e_3$, can be expressed as follows:

$$e_3 = \int e_i dt = e_1 \sin \omega t \quad (6)$$

The rate of flow, $u$, can be expressed in terms of the flow signal $e_t$ and induced signal $e_i$ in coil 50 by combining Equations 5 and 6 with Equation 1 as follows:

$$u = \frac{K_2}{K_1} n \frac{e_t}{e_i} d = K \frac{e_t}{e_i} d \quad (7)$$

where $n$ is the amplification factor of amplifier 40.

The self balancing potentiometer assembly including the differential amplifier 62, motor 64, potentiometer resistor 58 and slider 60 serve to move slider 60 to a point such that the potential appearing there on resistor 58 is equal to the flow signal, $e_t$, across electrodes 36 and 38. The flow signal can therefore be expressed in terms of the various resistances and the voltage induced in coil 50 by the following equation:

$$ne_t = p\frac{r}{r+R}e_3 \qquad (8)$$

wherein $r$ denotes the resistance of the potentiometer resistor 58, R denotes the value of the series resistor 56 and $p$ denotes in percent the position of a slider from the end of resistor 48 connected to resistor 54 at which motor 64 comes to a stop, combining Equations 7 and 8:

$$u = \frac{K_3.p.r.d.e_3}{(r+R).e_1} \qquad (9)$$

Since the values of $r$, R, and $d$ are fixed and $e_3$ and $e_1$ are both proportional to the field $\phi$, Equation 9 can be rewritten:

$$u = K_5 p \qquad (10)$$

It has been mathematically demonstrated therefore, that the rate of flow of liquid through pipe 12 can be expressed as a percentage of the distance that slider 60 is removed from the junction between resistors 54 and 58. The accuracy of the system so far described depends upon the linearity of the potentiometer resistor 58. Such resistors can be readily made with a high degree of accuracy.

In measuring rapidly pulsating rates of flow, the difference between the amplified flow signal $e_t$ to be measured and the voltage appearing on potentiometer resistor 58 at the point of contact with slider 60 will be sufficiently large to saturate the difference amplifier 62. Consequently the balancing motor 64 will operate at full voltage rating and at maximum speed. This will be true whether the balancing motor 64 is a two-phase servomotor supplied by an A.C. amplifier such as amplifier 62 or whether the balancing motor is a D.C. type motor supplied by a phase-sensitive D.C. input. Therefore, it is apparent that the balancing motor 64 will often be operating at constant maximum speed.

Since motor 64 is operating at substantially constant speed during substantial portions of the measuring cycle, it will take a finite time for the slider 60 to reach a potential point on potentiometer 58 equal to the amplifying flow signal $e_t$. Consequently, any variations in the rate of flow which are greater in amplitude and shorter in duration than the corresponding speed of motor 64 will produce flow signal variations that will not be followed correctly. It is desirable in general to use the self-balancing potentiometer system including amplifier 62 and motor 64 as a recording device and, therefore, the recorded flow will be in error.

Figures 2, 3:
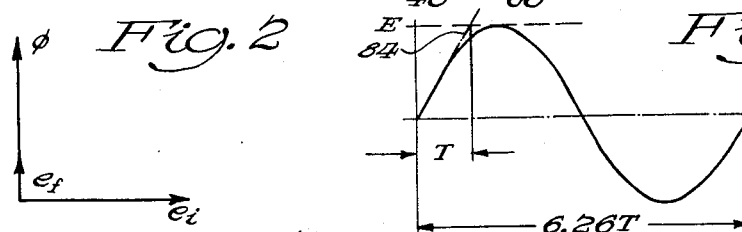
FIGURE 2 is a vector diagram illustrating the phase relationship among the voltage exciting the magnetic field, the flux produced by the exciting voltage and a voltage induced by the flux of the exciting field.
FIGURE 3 is a diagram illustrating the frequency response of a portion of the flowmeter illustrated in FIGURE 1.

The frequency response of the recording system including amplifier 62 and motor 64 can be closely approximated as follows. Referring to FIG. 3 of the drawings there is shown a plot of a pulsating flow signal E against time, signal E having an amplitude equal to full range movement of slider 60 and a frequency of pulsation equal to the maximum frequency response of the system. For purposes of analysis, flow signal E has been shown as being sinusoidal in character resulting from a sinusoidal pulsation in the rate of fluid flow through pipe 12. The maximum response rate of the system including amplifier 62 and motor 64 is represented by a straight line designated by the numeral 84. The frequency response capability of the system can be determined by calculating the equivalent slope of a sine function between zero degrees and one degree equal to the slope of line 84. The maximum response frequency which a system can follow and accurately record is given by the following equation:

$$\text{Frequency} = \frac{1}{6.26 T} \qquad (11)$$

wherein T denotes the time necessary for the slider to travel full scale.

In many instances it is important to measure and record the correct mean value of a pulsating flow rate, the frequency of the pulsations being greater than the frequency response of the potentiometer assembly as calculated by Equation 11. Unless the true mean value of the rate of flow is recorded, the instrument cannot be used as the sensing element of a controlling system for controlling a desired value of flow. Use of flowmeters of the present invention for such controlling purposes is an important advantage thereof.

According to the present invention, means is provided to ascertain and record the true mean value of pulsating flows in which the frequency of pulsations is greater than the frequency response of the potentiometer assembly including amplifier 62, motor 64 and potentiometer 58. The individual pulsations of flow are integrated by the device to be described hereinafter over a certain time interval. The time interval during which the flow signal is integrated is chosen to be larger than the response time of the recording and controlling assembly for a full scale flow signal.

A preferred form of integrating device or averaging network is a tuned circuit or the equivalent thereof placed between the origin of the flow signal and the input to the difference amplifier 62. There is shown in FIGURE 1 of the drawings such a tuned circuit including a reactance coil 86 connected in parallel with a capacitor 88. One end of the coil 86 and one plate of capacitor 88 are connected to each other and to line 68 and the other ends thereof are connected to the junction between resistor 54 and the potentiometer resistor 58.

The voltage across the terminals 90 and 92 of the tuned circuit (designated generally by the numeral 94) responds in a manner similar to that of a D.C. moving coil instrument having a current sudenly applied thereto. Such a response can be expressed mathematically by the following equation:

$$A = A_0 (1 - e^{-xt}) \qquad (12)$$

In the case of a tuned circuit:

$$x = \frac{\pi f}{Q} \qquad (13)$$

Combining Equations 12 and 13 the response of the tuned coil 94 can be expressed as follows:

$$A = A_0 \left(1 - e^{-\frac{\pi f}{Q}t}\right) \qquad (14)$$

wherein $f$ is the frequency of the pulsations and Q is determined by the ratio of reactance to resistance in tuned circuit 94 at frequency, $f$. The voltage appearing across the terminals 90 and 92 of tuned circuit 94 will be a correct indication of the mean value of the output from amplifier 40 if the time constant of the tuned circuit 94 is greater than the frequency of the flow pulsations being measured. Preferably connection is made from output terminal 96 of amplifier 40 through a line 98 to an intermediate point on the coil 86 of tuned circuit 94. In a practical application Q for the tuned circuit 94 will be chosen with a value of approximately 30 or 60 which would correspond to periods of ½ of a second and 1 second, respectively, during which the flow signal is integrated.

The operation of flowmeter 10 is as follows. Coils 30 and 32 are energized to establish a field perpendicular to the direction of flow of fluid through conduit 12. The flow signal generated in the moving fluid appears across electrodes 36 and 38 and is proportional to the flux field generated by coils 30 and 32.

A portion of the flux field generated by coils 30 and 32 also flows through magnet leg 28 and induces a voltage in coil 50 which is also proportional to the flux generated by coils 30 and 32, but 90 degrees out of phase therewith. The voltage induced in coil 50 is first fed to the integrating circuit including capacitor 52 and resistor 54 to shift the phase thereof 90 degrees. The phase shifted voltage (referred to as $e_3$ above) is then applied to a voltage divider network including the resistor 56 and potentiometer resistor 58. The slider 60 on the potentiometer applies a first input to the difference amplifier 62.

The flow signal generated between electrodes 36 and 38 is fed to the input of the linear decade amplifier 40 and the amplified flow signal is in turn applied to the tuned circuit 94. An integrated flow signal is taken from terminal 92 of tuned circuit 94 and fed through line 98 as the second input to the difference amplifier 62. The difference between thee amplified and integrated flow signal and the reference voltage appearing on slider 60 is then amplified and applied to coil 80 of motor 64. This causes operation of motor 64 to move slider 60 toward a point on resistor 58 equal in potential to the amplified and integrated flow signal appearing at terminal 92 of tuned circuit 94. By means of Equation 10 above, it is possible to determine the rate of flow through conduit 12 from the position of slider 60 along resistor 58. The rate of flow indicated by the flow meter 10 and recorded thereby if the potentiometer assembly is provided with a recorder, will be a true indication of the flow through conduit 12.

Figure 4:
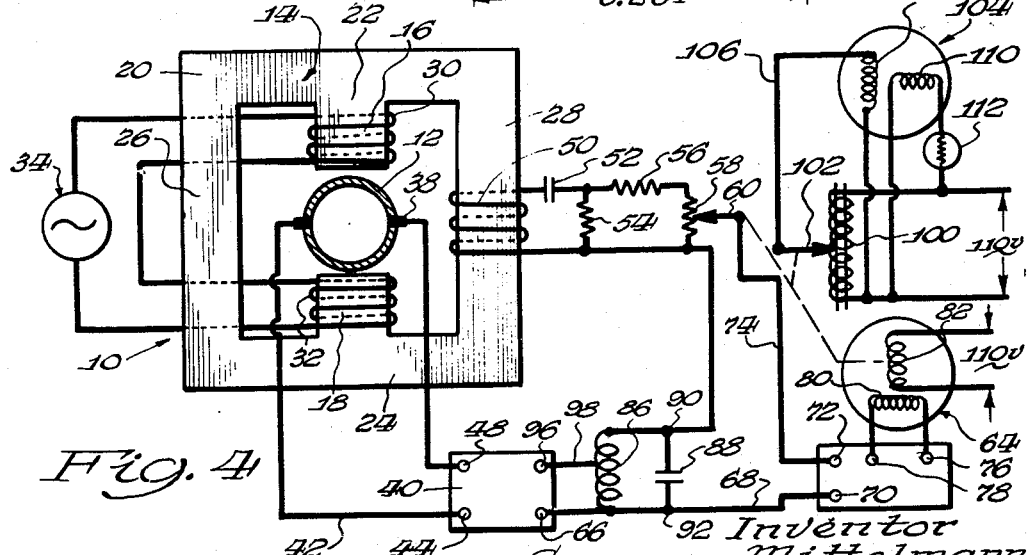
FIGURE 4 is a schematic diagram of a modified form of a flowmeter made in accordance with and incorporating the principles of the present invention, this flowmeter including means for totalizing rates of flow over relatively long periods of time.

In many instances a totalization of the flow over relatively long periods becomes desirable. A circuit to accomplish totalization is shown in FIGURE 4 of the drawings. Like parts have had like numerals applied thereto in FIGURES 1 and 4 and therefore, the construction and operation of the portions of figure common to FIGURE 1 will not be further described.

The totalizing circuit includes a variable auto-transformer designated by the numeral 100. Transformer 100 is preferably of the type made by the General Radio Company under the trade name "Variac." Transformer 100 is provided with a slider 102 which is mechanically connected to slider 60 and the movable coil 82 of the two-phase motor 64. The position of slider 102 on coil 100 is so adjusted with respect to the position of slider 60 with respect to potentiometer resistor 58 that the zero position of slider 60 corresponds to zero voltage between the output terminals of transformer 100. Similarly the movement of slider 102 along coil 100 is coordinated with the movement of slider 60 along resistor 58 so that the slider 102 is always at a potential point to produce an output from transformer 100 that is the same percentage of the total potential possible from transformer 100 as the potential point of slider 60 with respect to the total potential available across resistor 58.

The output from transformer 100 is utilized to drive a watt-hour meter generally designated by the numeral 104. More specifically a line 106 makes electrical connection from slider 102 to one end of the voltage coil 108 of meter 104. The auto-transformer 100 and the current coil 110 of meter 104 are both powered from a suitable source such as a 60 cycle 110 volt power supply. Preferably a current regulator tube 112 is inserted in the line applying current coil 110 so that a constant current is applied thereto.

With the above described arrangement the disc of the watt-hour meter will at any time rotate with a speed directly proportional to the position of slider 102 along transformer 100 and to the position of slider 60 along resistor 58. Means may be provided to count the revolutions of the watt-hour meter disc and the total of the revolutions will be a correct indication of the total flow during the time interval counted. Any suitable means such as a photo-electric counter or a magnetic counter may be used to count the revolutions of the indicator disc of the watt-hour meter 104.

It will be seen that there has been provided a flowmeter which fulfills all of the objects and advantages set forth above. Although certain preferred forms of the invention have been shown for purposes of illustration, it is to be understood that the invention should be limited only as set forth in the following claims.

I claim:
1. Apparatus for measuring fluid flow comprising a conduit for carrying a flowing fluid, means for establishing an alternating magnetic field through a section of said conduit, a plurality of electrodes electrically connecting with a fluid flowing in said conduit to detect an A.C. potential induced in the fluid, an averaging network to integrate the amplitude modulated A.C. potential appearing across said electrodes to obtain an A.C. signal proportional to the mean value thereof, a coil threaded by a part of the flux establishing the alternating magnetic field, a phase shifting network connected to said coil to provide an A.C. voltage therefrom in phase with and proportional to the alternating magnetic field, and means for comparing the output of said averaging network and the A.C. voltage from said phase shifting network whereby to measure the A.C. potential induced in the fluid, the time constant of said averaging network being of the same order as the time constant of said comparing means.

2. Apparatus for measuring fluid flow comprising a conduit for carrying a flowing fluid, means for providing an alternating magnetic flux to establish an alternating magnetic field through a section of said conduit, a plurality of electrodes electrically connecting with a fluid flowing in said conduit to detect an A.C. potential induced in the fluid, an averaging network for integrating the amplitude modulated A.C. potential appearing across said electrodes to obtain an A.C. signal proportional to the mean value thereof, a coil threaded by a part of the flux establishing the alternating magnetic field, a phase shifting circuit connected to said coil to provide an A.C. voltage therefrom in phase with and proportional to the alternating magnetic field, and a self-balancing electronic potentiometer for comparing the output from said averaging network and the A.C. voltage from said phase shifting circuit whereby to measure the flow rate of the fluid, the time constant of said averaging network being substantially at least as great as the time required for full scale movement of said self-balancing electronic potentiometer.

3. Apparatus for measuring fluid flow comprising a conduit for carrying a flowing fluid, means for providing an alternating magnetic flux to establish an alternating magnetic field through a section of said conduit, a plurality of electrodes electrically connecting with a fluid flowing in said conduit to detect an A.C. potential induced in the fluid, an averaging network for integrating the amplitude modulated A.C. potential appearing across said electrodes to obtain an A.C. signal proportional to the mean value thereof, a coil threaded by a part of the flux establishing the alternating magnetic field, a phase shifting network connected to said coil to provide an A.C. voltage therefrom in phase with and proportional to the alternating magnetic field, a self-balancing electronic potentiometer including a potentiometer resistor having a slider making contact therewith connected across said phase shifting network, and means to compare a portion of the A.C. voltage appearing across said potentiometer resistor with the A.C. output from said averaging network and to move said slider to a point on said potentiometer resistor proportional in potential to the output from said averaging network whereby to measure the flow rate of the fluid, the time constant of said averaging network being greater than the time required for full scale movement of said slider.

4. Apparatus for measuring fluid flow comprising a conduit for carrying a flowing fluid, means for establishing an alternating magnetic field through a section of said conduit, a plurality of electrodes electrically connected with a fluid flowing in said conduit to detect an A.C. potential induced in the fluid, an averaging network connected across said electrodes to integrate the amplitude modulated A.C. potential induced in the fluid to obtain an A.C. signal proportional to the mean value thereof, a coil threaded by a part of the flux establishing the alternating magnetic field, a phase shifting network connected to said coil to provide an A.C. voltage therefrom in phase with and proportional to the alternating magnetic field, a self-balancing electronic potentiometer to compare the integrated A.C. potential induced in the A.C. fluid and the voltage from said phase shifting network, and means driven by said self-balancing electronic potentiometer to totalize the fluid flow through said conduit.

5. Apparatus for measuring fluid flow comprising a conduit for carrying a flowing fluid, means for establishing an alternating magnetic field through a section of said conduit, a plurality of electrodes electrically connecting with a fluid flowing in said conduit to detect an A.C. potential induced in the fluid, an averaging network connected to said electrodes to integrate the amplitude modulated A.C. potential appearing therebetween to obtain an A.C. signal proportional to the mean value thereof, a coil threaded by a part of the flux establishing the alternating magnetic field, a phase shifting network connected to said coil to provide an A.C. voltage therefrom in phase with and proportional to the magnetic field, a self-balancing electronic potentiometer including a potentiometer resistor having a slider making contact therewith connected across said phase shifting network, a difference amplifier to detect the potential difference between the integrated A.C. potential induced in the fluid and the A.C. voltage from said phase shifting network and to amplify the difference potential, a motor driven by the output of said amplifier and connected to said slider to move said slider to a point on said potentiometer resistor proportional in potential to the integrated potential induced in the fluid whereby to measure the rate of fluid flow, a variable auto-transformer having a slider making contact therewith, means interconnecting said motor and said auto-transformer slider to vary the output from said auto-transformer in a manner proportional to the rate of flow of fluid through said conduit, and means connected to the output of said auto-transformer to totalize the fluid flow through said conduit.

6. Apparatus for measuring fluid flow comprising a conduit for carrying a flowing fluid, means for establishing an alternating magnetic field through a section of said conduit, a plurality of electrodes electrically connecting with a fluid flowing in said conduit to detect an A.C. potential induced in the fluid, an averaging network connected to said electrodes to integrate the amplitude modulated A.C. potential appearing therebetween to obtain an A.C. signal proportional to the mean value thereof, a coil threaded by a part of the flux establishing the alternating magnetic field, a phase shifting network connected to said coil to provide an A.C. voltage therefrom in phase with and proportional to the alternating magnetic field, a self-balancing electronic potentiometer including a potentiometer resistor having a slider making contact therewith connected across said phase shifting network, a difference amplifier to detect the potential difference between the integrated potential induced in the fluid and the voltage from said phase shifting network and to amplify the difference potential, a motor driven by the output of said amplifier and connected to said slider to move said slider to a point on said potentiometer resistor proportional in potential to the integrated potential induced in the fluid whereby to measure the rate of fluid flow, a variable auto-transformer having a slider making contact therewith, means interconnecting said motor and said auto-transformer slider to vary the output from said auto-transformer in a manner proportional to the rate of flow of fluid through said conduit, a watt-hour meter connected to the output of said auto-transformer and having an indicating disc, and means to count the revolutions of said indicating disc to totalize the flow through said conduit.

References Cited in the file of this patent

UNITED STATES PATENTS

| | | |
|---|---|---|
| 2,435,043 | Lehde et al. | Jan. 27, 1948 |
| 2,603,688 | Cole et al. | July 15, 1952 |
| 2,696,737 | Mittelmann | Dec. 14, 1954 |
| 2,729,103 | Raynsford et al. | Jan. 3, 1956 |
| 2,757,538 | Soffel | Aug. 7, 1956 |
| 2,767,582 | Bartelink | Oct. 23, 1956 |
| 2,844,568 | Mertz | July 22, 1958 |

FOREIGN PATENTS

| | | |
|---|---|---|
| 286,469 | Great Britain | Mar. 8, 1928 |

OTHER REFERENCES

Text, Alternating Current Circuits by Kerchner and Corcoran, 3rd edition, John Wiley & Sons, N.Y., page 236.

Article: "An Induction Flowmeter Design Suitable for Radioactive Liquids," by W. G. James. Published in Review of Scientific Instruments, vol. 22, No. 12, December 1951.

UNITED STATES PATENT OFFICE
CERTIFICATE OF CORRECTION

Patent No. 3,002,383                       October 3, 1961

Eugene Mittelmann

It is hereby certified that error appears in the above numbered patent requiring correction and that the said Letters Patent should read as corrected below.

Column 1, line 65, for "nvention" read -- invention --; column 2, line 44, for "leg" read -- legs --; column 4, lines 65 to 69, the equation should appear as shown below instead of as in the patent:

$$u = \frac{K_2}{K_1} n \frac{e_f}{e_i} d = K_3 \frac{e_f}{e_i} d$$

column 6, line 33, for "sudenly" read -- suddenly --; column 7, line 11, for "thee" read -- the --.

Signed and sealed this 10th day of April 1962.

Attest:
ERNEST W. SWIDER
Attesting Officer

DAVID L. LADD
Commissioner of Patents